C. D. CURRY.
CHUCK FOR PAPER ROLL SHAFTS.
APPLICATION FILED DEC. 19, 1910.
1,016,738.
Patented Feb. 6, 1912.
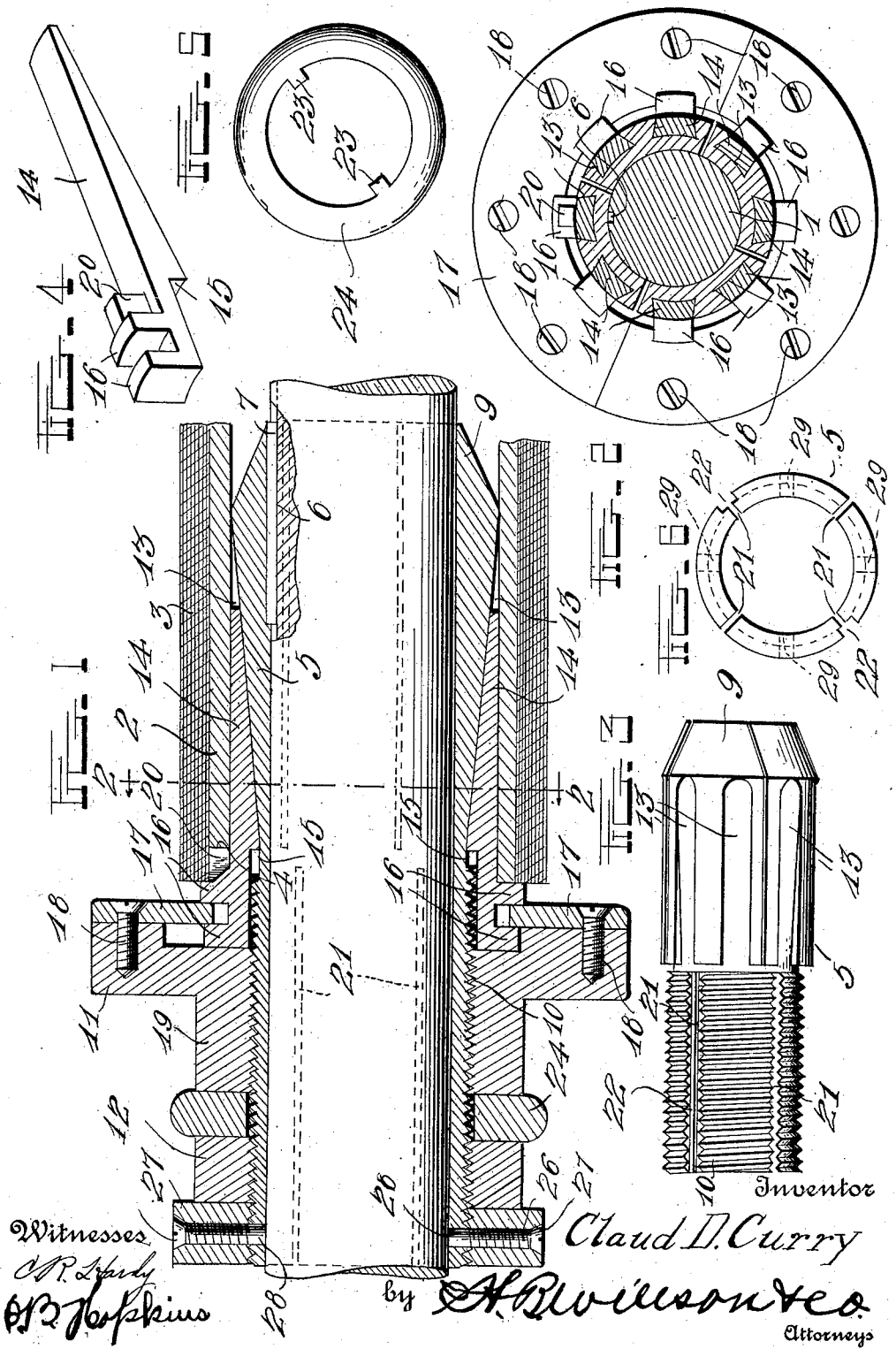
Inventor
Claud D. Curry
Witnesses
by H. R. Williamson & Co.
Attorneys

UNITED STATES PATENT OFFICE.

CLAUD D. CURRY, OF BROOKLYN, NEW YORK.

CHUCK FOR PAPER-ROLL SHAFTS.

1,016,738. Specification of Letters Patent. Patented Feb. 6, 1912.

Application filed December 19, 1910. Serial No. 598,054.

*To all whom it may concern:*

Be it known that I, CLAUD D. CURRY, a citizen of the United States, residing at Brooklyn, in the county of Kings and State of New York, have invented certain new and useful Improvements in Chucks for Paper-Roll Shafts; and I do declare the following to be a full, clear, and exact description of the invention, such as will enable others skilled in the art to which it appertains to make and use the same.

My present invention relates to chucks or devices for securing paper rolls to shafts and the particular object of the present invention is to provide a construction which shall possess the simplicity of the device shown in Letters-Patent No. 967,334, granted to myself and Albert W. Linn, August 16, 1910, while attaining a higher degree of efficiency.

Secondary objects of the invention are to facilitate the insertion of the chuck within the core upon which the paper web is wound and prevent rotation of the chuck relative to either the shaft or the core.

The invention also seeks to provide means whereby the chuck will be prevented from working loose and out of the core during use.

These several stated objects and such other objects as will hereinafter incidentally appear are attained in the use of the device illustrated in the accompanying drawings, and the invention consists in certain novel features of the same which will be hereinafter first fully described and then more specifically pointed out in the appended claims.

In the annexed drawings:—Figure 1 is a longitudinal section showing the application of my improvements to a shaft and core, a portion of the paper web being indicated in position on the core; Fig. 2 is a transverse section on the line 2—2 of Fig. 1, the paper web and the core being omitted; Fig. 3 is a detail elevation of the inner sleeve member of the chuck; Fig. 4 is a detail perspective view of one of the wedges; Fig. 5 is a detail of the washer; Fig. 6 is a detail view of the outer end of the sleeve.

The shaft 1 may be of the usual or any preferred form and is provided with the usual fixed tapered or conical enlargement or block to fit in one end of the core, which is commonly employed and is so well known that its illustration is superfluous. The core 2 carries the paper web 3 and is provided at one end with a notch 4 to be engaged by a locking member to prevent rotation of the chuck relative to the core, as will be readily understood and as shown in the hereinbefore-mentioned Letters-Patent.

In carrying out my present invention, I employ as the inner or base member of the chuck a split sleeve 5 which has a smooth bore and may carry a key 6 adapted to engage a keyway or groove 7 in the shaft 1, whereby rotation of the chuck upon the shaft is positively prevented. The inner end of the sleeve 5 is tapered, as shown at 9, to facilitate the insertion of the same within the core and the outer end of the sleeve is externally threaded, as shown at 10, to receive an adjusting ring nut 11 and a locking nut 12. Between the threaded portion of the sleeve and the inner tapered extremity of the same, I provide, in the outer surface of the sleeve, a plurality of longitudinal tapered dove-tailed grooves 13 and in the said grooves I slidably mount a series of wedge-shaped or tapered slides or keys 14 which are adapted to bear against the inner surface of the core 2 and, when moved longitudinally in the grooves, to be forced radially outward into binding engagement with the said core so as to securely clamp the members of the chuck to the core and the shaft so that the parts cannot easily separate while in use. It will be observed upon reference to Fig. 2, that the outer surfaces of these sliding keys or recesses are convex so that when they are drawn out to their fullest extent, they will lie flush with the other surfaces of the split sleeve and the entrance of the sleeve and the locking keys or wedges into the core may be easily and quickly effected. The external diameter of the sleeve is greater through its grooved portion than through its threaded portion and the keys or wedges are provided with transverse shoulders 15 on their under sides, whereby their outward movement will be limited by the contact of said shoulders with the innermost thread of the sleeve, the outer ends of the wedges extending over the said threaded portion and being provided with external spaced lugs 16 between which fits an overhanging flange 17 of the adjusting nut 11. It will be observed that I have illustrated the nut as having a countersunk or recessed inner face to which the overhanging flange 17 is secured by means of screws 18, and this construction is preferred as it facilitates the assembling of the parts. It will also be noted that the inner recessed or countersunk face of the adjusting nut provides a chamber to receive the outer ends of the wedges or keys so that the parts will be compactly arranged and the frictional strain, due to the resistance of the keys to the longitudinal movement of the sleeve, is distributed over a wide area.

The adjusting nut is provided on its outer face with an angular projection 19 which may be engaged by a wrench or similar tool to turn the nut upon the sleeve and thereby secure the chuck within the core. In order to prevent the release of the nut after the parts have been adjusted to bind the chuck within the core, I mount the lock nut 12 on the threaded portion of the sleeve in position to be turned up against the angular projection 19 and bind against the same so as to prevent retrograde movement thereof. One of the wedges or locking keys is provided with a locking member or tooth 20, adjacent the spaced lugs 16, adapted to engage the notch 4 in the end of the core thereby preventing rotation of the chuck relative to the core. The sleeve is extended outwardly so that its threaded portion will project beyond the core and this outwardly projecting portion of the sleeve is split longitudinally, as shown at 21, so that the said outer portion of the sleeve may be effectually clamped around the shaft and the entire length of the sleeve thereby secured to the shaft so that it will not be capable of rotation thereon. The threaded portion of the sleeve is, furthermore, provided with longitudinal grooves 22 adapted to receive internal lugs 23 on a washer 24 which is fitted upon the sleeve adjacent the adjusting nut as clearly shown.

The several parts will be so relatively proportioned that when the lock nut is rotated on the threads to move longitudinally of the sleeve the sections of the sleeve will be forced to contract around the shaft so as to firmly clamp the same as will be readily understood.

The lock nut 12 is mounted upon the sleeve to bear against the washer 24 which is arranged between the same and the adjusting nut, as clearly shown in Fig. 1. A milled ring 26 is provided to serve as a handle to facilitate the turning of the sleeve and this ring is secured upon the outer end of the sleeve by screws 27 inserted radially through the ring and having smooth inner ends 28 adapted to engage openings 29 provided therefor in the end of the sleeve, this construction facilitating the assembling of the parts.

The device may be manipulated by hand so as to avoid the use of a wrench or other gripping tool which is apt to be lost and, consequently, may be readily operated at all times.

The construction and arrangement of the several parts being thus made known, it is thought the operation and advantages of the same will be readily understood and appreciated.

When the device is to be fitted to a paper roll, the adjusting nut is turned so as to withdraw the wedges or sliding keys to their full extent which will be determined by the shoulders on the under sides of the said wedges impinging against the innermost thread of the tapered sleeve and, consequently, preventing further longitudinal movement of the wedges and sleeve relative to each other. The device is then inserted in the end of the core in such position that the projection 20 will engage the notch 4 in the end of the core and the key in the bore of the sleeve will engage the longitudinal groove or keyway in the shaft. The adjusting nut is then turned so as to ride upon the threads on the sleeve toward the end of the core thereby driving the innermost lug 16 on the several wedges against the end of the core after which the continued rotation of the adjusting nut will cause the sleeve to move outwardly through the core and under the wedges, the result of which movement is to expand or spread the wedges radially so that they will bind against the inner surface of the core and to contract the split sleeve radially so that it will bind firmly around and clamp the shaft. After the adjusting nut has been turned so as to bind the parts together in the manner just described, the washer is moved up against the same after which the lock nut is turned loosely against the washer. If the washer be now held with one hand, the sleeve may be readily rotated by the other hand grasping the milled ring or handle so that the sleeve may be drawn outwardly through the adjusting nut and the washer and, consequently, the wedges or locking keys forced outwardly against the core so as to bind against the same with a very strong gripping force. After the desired adjustment of the parts has been effected, the lock nut is turned home against the washer and accidental release of the device is thereby prevented.

It will be readily observed that in my invention, the binding action of the chuck is direct between the shaft and the core, and no part of the holding force is lost through intermediate parts. The adjustment of the chuck may be accomplished rapidly and easily inasmuch as there is a movement of both the sleeve and the wedges longitudinally with respect to each other and not of one upon the other alone.

While I have described my device as applied to a paper roll and it is more particularly intended for use upon paper rolls or webs which are fed into printing machines, it is to be understood that its use is not confined to that particular field but that it is capable of application to any machine or apparatus in which it is necessary to secure an outer hollow shaft to an inner rod or solid shaft.

Having thus described my invention, what I claim is:—

1. The combination with a shaft, and a hollow core surrounding the same, of a sleeve split at both ends fitting around the shaft, the inner portion of the sleeve being provided with external longitudinal tapering grooves and the outer portion being externally threaded, wedges fitted in said grooves and having their outer sides bearing against the core and their outer ends projecting beyond the end of the core, an adjusting nut mounted on the threaded portion of the sleeve and engaging said wedges to move the same longitudinally of the sleeve, and a lock nut mounted on the sleeve and arranged to hold the adjusting nut in set position.

2. The combination with a shaft, and a hollow core surrounding the same, of a sleeve split at both ends fitting closely around the shaft and provided with a plurality of external longitudinally tapering grooves and having its inner extremity tapered toward the shaft, a plurality of wedges engaging said grooves and having convex outer sides flush with the outer surfaces of the sleeve when the wedges are in their outermost position, and means mounted on the outer portion of the sleeve and engaging the projecting ends of the wedges to move the same longitudinally of the grooves whereby the sleeve will be caused to bind around the shaft and the wedges to bind within the core.

3. The combination with a shaft, and a hollow core surrounding the same, of a sleeve split at both ends fitting around the shaft and having its outer end externally threaded and its inner end provided with longitudinal external tapering grooves, wedges fitted in said grooves and having their outer ends projecting over the threaded portion of the sleeve and provided on their inner faces with transverse shoulders adapted to impinge against the end of the threaded portion of the sleeve, and an adjusting nut mounted on the said threaded portion of the sleeve and engaging said wedges whereby rotation of the nut will cause the wedges to expand against the core and the sleeve to contract around the shaft.

4. The combination with a shaft, and a hollow core surrounding the same, of a split sleeve fitting around the shaft and having a threaded outer portion and provided in its inner portion with external longitudinal tapered grooves, the sleeve being further provided with longitudinal grooves in the outer surface of its threaded portion, wedges fitted in the tapering grooves of the sleeve, an adjusting nut mounted on the threaded portion of the sleeve and engaging said wedges, a washer having internal lugs engaging the longitudinal grooves of the threaded portion of the sleeve and adapted to rest against the adjusting nut, and a lock nut mounted on the said threaded portion of the sleeve and bearing against said washer.

5. A chuck for the purpose set forth comprising a split sleeve having an externally threaded outer portion provided with longitudinal grooves and having an inner portion provided with longitudinal tapering grooves, wedges slidably fitted in said tapering grooves, an adjusting nut mounted on the threaded portion of the sleeve and engaging said wedges, a washer having internal lugs engaging the grooves in the threaded portion of the sleeve and bearing against the adjusting nut, a lock nut fitted on the threaded portion of the sleeve and bearing against said washer, and a milled ring detachably secured on the outer extremity of the sleeve.

In testimony whereof I have hereunto set my hand in presence of two subscribing witnesses.

CLAUD D. CURRY.

Witnesses:
J. H. S. MARTIN,
C. S. SNIFFER.